United States Patent
Ye (10) Patent No.: US 11,790,607 B2
(45) Date of Patent: Oct. 17, 2023

(54) METHOD AND APPARATUS FOR DISPLAYING HEAT MAP, COMPUTER DEVICE, AND READABLE STORAGE MEDIUM

(71) Applicant: Tencent Technology (Shenzhen) Company Limited, Shenzhen (CN)

(72) Inventor: Qianqian Ye, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/527,005

(22) Filed: Nov. 15, 2021

(65) Prior Publication Data

US 2022/0076487 A1 Mar. 10, 2022

Related U.S. Application Data (63) Continuation of application No. PCT/CN2020/125823, filed on Nov. 2, 2020.

(30) Foreign Application Priority Data

Feb. 18, 2020 (CN) .......................... 202010099511.9

(51) Int. Cl.
*G06T 17/20* (2006.01)
*G06T 17/10* (2006.01)
(Continued)

(52) U.S. Cl.
CPC ................ *G06T 17/20* (2013.01); *G06T 1/20* (2013.01); *G06T 15/005* (2013.01); *G06T 15/04* (2013.01); *G06T 15/80* (2013.01); *G06T 17/10* (2013.01)

(58) Field of Classification Search
CPC ........... G06T 17/20; G06T 17/10; G06T 1/20; G06T 15/005; G06T 15/04; G06T 15/80
See application file for complete search history.

(56) References Cited

U.S. PATENT DOCUMENTS

| 2018/0207531 A1 | 7/2018 | Kurabayashi |
| 2020/0019921 A1 | 1/2020 | Buibas et al. |
| 2020/0210056 A1* | 7/2020 | Steppan ................ G06T 11/206 |

FOREIGN PATENT DOCUMENTS

| CN | 104881839 A | 9/2015 |
| CN | 105741334 A | 7/2016 |

(Continued)

OTHER PUBLICATIONS

Tencent Technology, WO, PCT/CN2020/125823, dated Jan. 27, 2021, 5 pgs.

(Continued)

*Primary Examiner* — Michelle Chin
(74) *Attorney, Agent, or Firm* — Morgan, Lewis & Bockius LLP (57) ABSTRACT

This application discloses a method and apparatus for displaying a heat map, a computer device, and a readable storage medium, and relates to the field of interface display. The method includes: acquiring coordinate data of a heat point position, and transmitting the coordinate data to a graphics processing unit (GPU); converting a point primitive set corresponding to the coordinate data into a patch primitive set by the GPU; shading and rendering the patch primitive set by the GPU; and displaying a heat map corresponding to the heat point position. In a process of calculating and rendering the heat map, a central processing unit (CPU) only needs to confirm coordinate data of a heat point position before transmitting point primitives corresponding to the coordinate data to the GPU, and the heat map is calculated by the GPU for rendering. Through the (Continued)

foregoing method, in the process of calculating and rendering the heat map, most operations are transferred to the GPU, thereby reducing calculation pressure of the CPU, and releasing computing resources of the CPU for other program logic to use.

17 Claims, 7 Drawing Sheets

(51) Int. Cl.
*G06T 15/80* (2011.01)
*G06T 15/04* (2011.01)
*G06T 15/00* (2011.01)
*G06T 1/20* (2006.01)

(56) References Cited

FOREIGN PATENT DOCUMENTS

| | | | |
|---|---|---|---|
| CN | 109189878 A | | 1/2019 |
| CN | 109492070 A | | 3/2019 |
| CN | 109621413 A | | 4/2019 |
| CN | 109636894 A | | 4/2019 |
| CN | 109658455 A | | 4/2019 |
| CN | 109726261 A | | 5/2019 |
| CN | 110264539 A | | 9/2019 |
| CN | 110544290 A | | 12/2019 |
| CN | 110738722 A | | 1/2020 |
| CN | 110738722 A | * | 1/2020 ............. G06T 15/04 |
| CN | 110766770 A | | 2/2020 |
| CN | 111325822 A | | 6/2020 |
| JP | 2003044877 A | | 2/2003 |
| JP | 2020024688 A | | 2/2020 |
| WO | WO 2018103633 A1 | | 6/2018 |

OTHER PUBLICATIONS

Tencent Technology, IPRP, PCT/CN2020/125823, dated Aug. 23, 2022, 6 pgs.

Tencent Technology, Singapore Office Action, SG Patent Application No. 11202111637V, dated Mar. 20, 2023, 9 pgs.

Tencent Technology, ISR, PCT/CN2020/125823, dated Jan. 27, 2021, 3 pgs.

Tencent Technology, Korean Office Action, KR Patent Application No. 10-2021-7035911, Aug. 25, 2023, 10 pgs.

* cited by examiner

METHOD AND APPARATUS FOR DISPLAYING HEAT MAP, COMPUTER DEVICE, AND READABLE STORAGE MEDIUM

CROSS-REFERENCE TO RELATED APPLICATIONS

This application is a continuation application of PCT Patent Application No. PCT/CN2020/125823, entitled "HOTSPOT MAP DISPLAY METHOD AND APPARATUS, AND COMPUTER DEVICE AND READABLE STORAGE MEDIUM" filed on Nov. 2, 2020, which claims priority to Chinese Patent Application No. 202010099511.9, filed with the State Intellectual Property Office of the People's Republic of China on Feb. 18, 2020, and entitled "METHOD AND APPARATUS FOR DISPLAYING HEAT MAP, DEVICE, AND READABLE STORAGE MEDIUM", all of which are incorporated herein by reference in their entirety.

FIELD OF THE TECHNOLOGY

Embodiments of this application relate to the field of interface display, and in particular, to a method and apparatus for displaying a heat map, a computer device, and a readable storage medium.

BACKGROUND OF THE APPLICATION

A heat map is used for reflecting distribution of objects or events, for example, data distribution, distribution of virtual objects in a virtual environment, and blocking distribution of virtual objects in a virtual environment. Schematically, virtual objects are included in a virtual environment, a minimap is displayed in a virtual environment interface, and a player can control the minimap to display a heat map corresponding to the virtual environment, where the heat map reflects distribution of the virtual objects in the virtual environment.

In the related art, during rendering of the heat map in the minimap, coordinates of the virtual objects in the virtual environment are acquired first, after coordinates of all virtual objects are traversed, a circular attenuation of the heat map is calculated, and texture data is generated. The texture data is transmitted by a central processing unit (CPU) to a graphics processing unit (GPU) for rendering.

However, during the rendering of the heat map, the required texture data of the heat map can be generated only through heavy CPU calculations, and the load of the CPU is relatively heavy, which is likely to cause a terminal to freeze.

SUMMARY

Embodiments of this application provide a method and apparatus for displaying a heat map, a computer device, and a readable storage medium, to release computing resources of a CPU for other program logic, and improve an operating speed of a terminal. The technical solutions are as follows:

According to one aspect, a method for displaying a heat map is performed at a computer device including at least one central processing unit (CPU) and at least one graphics processing unit (GPU) that is communicatively connected to the CPU, the method including:

acquiring coordinate data of a heat point position by the CPU, and transmitting the coordinate data from the CPU to the GPU;

converting a point primitive set corresponding to the coordinate data into a patch primitive set by the GPU, the patch primitive set comprising patch primitives corresponding to the coordinate data, the patch primitives being combined to generate a heat point region corresponding to the coordinate data in a heat map;

shading and rendering the patch primitive set by the GPU, to obtain the heat map; and displaying the heat map corresponding to the heat point position.

According to another aspect, a computer device is provided, including a central processing unit (CPU), a graphics processing unit (GPU) that is communicatively connected to the CPU, and a memory, the memory storing at least one program, the at least one program, when executed by the CPU and the GPU, cause the computer device to implement the method for displaying a heat map according to any one of the foregoing embodiments of this application.

According to another aspect, a non-transitory computer-readable storage medium is provided, storing at least one computer program, the computer program, when executed by a central processing unit (CPU) and a graphics processing unit communicatively connected to the CPU within a computer device, causes the computer device to implement the method for displaying a heat map according to any one of the foregoing embodiments of this application.

The technical solutions provided in the embodiments of this application produce at least the following beneficial effects:

After coordinate data of a heat point position is confirmed by using a CPU, point primitives corresponding to the coordinate data are transmitted to a GPU. The GPU converts a point primitive set corresponding to the coordinate data to obtain a corresponding patch primitive set. After the patch primitive set is shaded and rendered, a heat map is obtained and displayed, so that in a process of calculating and rendering the heat map, most operations are transferred to the GPU, thereby reducing calculation pressure of the CPU, and releasing computing resources of the CPU for other program logic to use.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes implementations of this application in detail with reference to the accompanying drawings.

First, terms involved in the embodiments of this application are briefly introduced.

(1) Virtual Environment

The virtual environment is a virtual environment displayed (or provided) when an application program runs on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment. This is not limited in this application. A description is made by using an example in which the virtual environment is a three-dimensional virtual environment in the following embodiments.

(2) Virtual Object

The virtual object is a movable object in the virtual environment. The movable object may be a virtual character, a virtual animal, a cartoon character, or the like, such as a character, an animal, a plant, an oil drum, a wall, a stone, or the like displayed in the three-dimensional virtual environment. In some embodiments, the virtual object is a three-dimensional model created based on a skeletal animation technology. Each virtual object has a shape and size in the three-dimensional virtual environment, and occupies some space in the three-dimensional virtual environment.

(3) Heat Map

The heat map refers to a specific event with different degrees corresponding to different regions displayed in a highlighted form. In the embodiments of this application, the heat map is used for indicating blocking distribution of virtual objects in a virtual environment in a highlighted form. Schematically, in the virtual environment, if a quantity of times that positions of the virtual object are acquired in a first region is 20, a quantity of times that positions of the virtual objects are acquired in a second region is 10, and a quantity of times that positions of the virtual objects are acquired in a third region is 2, in the heat map, the first region is represented by red, the second region is represented by green, and the third region is represented by yellow.

Figure 1:
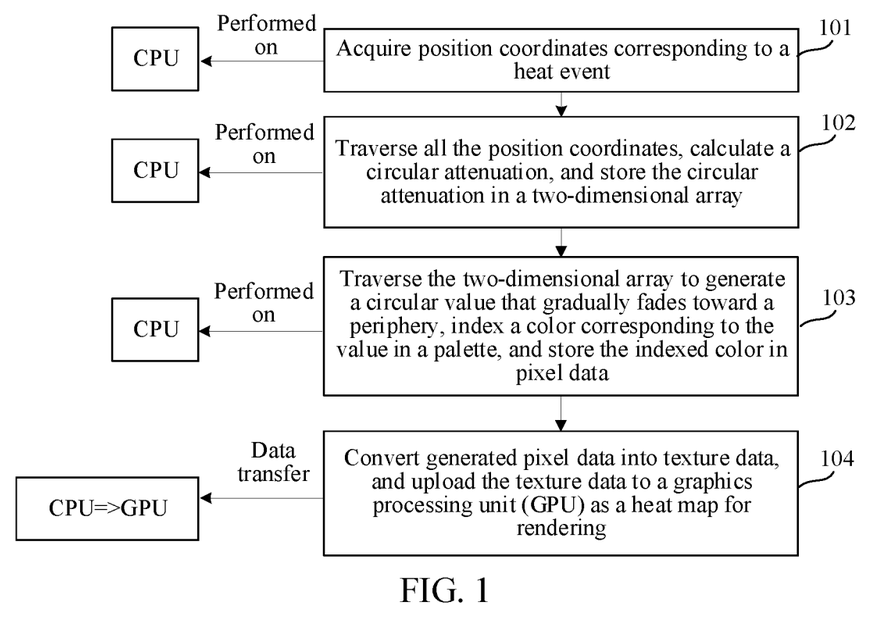
FIG. 1 is a schematic diagram of a process of rendering a heat map according to an exemplary embodiment of this application.

In the related art, during rendering of the heat map, schematically, FIG. 1 is a schematic diagram of a process of rendering a heat map according to an exemplary embodiment of this application, and the process of rendering a heat map in the related art includes the following steps:

Step 101. A CPU acquires position coordinates corresponding to a heat event.

Step 102. The CPU traverses all the position coordinates, calculates a circular attenuation, and stores the circular attenuation in a two-dimensional array.

Step 103. The CPU traverses the two-dimensional array to generate a circular value that gradually fades toward a periphery, indexes a color corresponding to the value in a palette, and stores the indexed color in pixel data.

Step 104. The CPU converts generated pixel data into texture data, and uploads the texture data to a GPU as a heat map for rendering.

However, the process of rendering the heat map in the related art is completely calculated by the CPU. Required texture pixel data of the heat map can be generated only by traversing a huge array and performing heavy CPU operations in the whole process, resulting in heavy load on the CPU. Moreover, the pixel data calculated on the CPU for each frame needs to be uploaded to the GPU for rendering, resulting in frequent exchanges of large amounts of data between the CPU and the GPU.

A terminal in this application may be a desktop computer, a portable laptop computer, a mobile phone, a tablet computer, an ebook reader, a Moving Picture Experts Group Audio Layer III (MP3) player, a Moving Picture Experts Group Audio Layer IV (MP4) player, or the like. An application program supporting a virtual environment is installed and run on the terminal, such as an application program supporting a three-dimensional virtual environment. The application program may be any one of a virtual reality (VR) application program, a three-dimensional map program, a military simulation program, a third-person shooter (TPS) game, a first-person shooter (FPS) game, and a multiplayer online battle arena (MOBA) game. In some embodiments, the application program may be a standalone application program, such as a standalone three-dimensional game program, or may be a network online application program.

Figure 2:
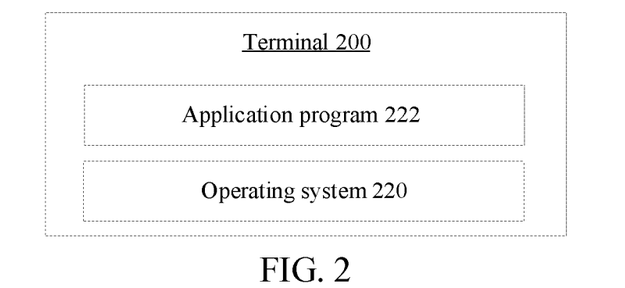
FIG. 2 is a structural block diagram of a terminal according to an exemplary embodiment of this application.

FIG. 2 is a structural block diagram of an electronic device according to an exemplary embodiment of this application. The electronic device 200 includes an operating system 220 and an application program 222.

The operating system 220 is basic software provided for the application program 222 to perform secure access to computer hardware.

The application program 222 is an application program supporting a virtual environment. In some embodiments, the application program 222 is an application program supporting a three-dimensional virtual environment. The application program 222 may be any one of a VR application program, a three-dimensional map program, a military simulation program, a TPS game, an FPS game, a MOBA game, and a multiplayer shooting survival game. In some embodiments, the application program 222 may be a standalone application program, such as a standalone three-dimensional game program, or may be a network online application program.

Figure 3:
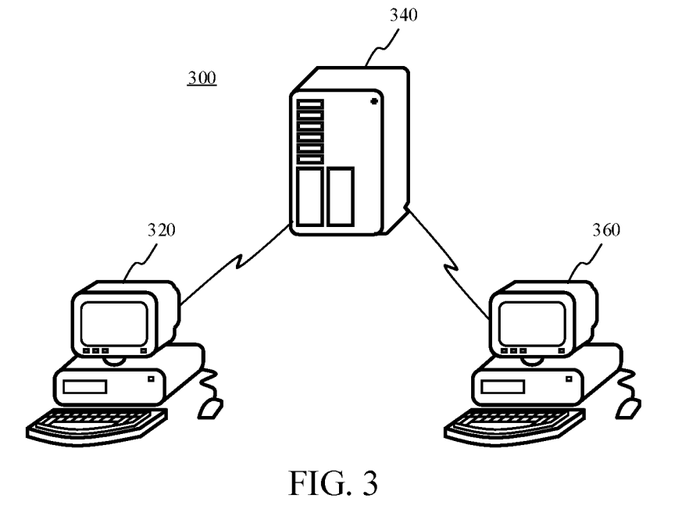
FIG. 3 is a schematic diagram of an implementation environment according to an exemplary embodiment of this application.

FIG. 3 is a structural block diagram of a computer system according to an exemplary embodiment of this application. The computer system 300 includes a first device 320, a server 340, and a second device 360.

An application program supporting a virtual environment is installed and run on the first device 320. The application program may be any one of a VR application program, a three-dimensional map program, a military simulation program, a TPS game, an FPS game, a MOBA game, and a multiplayer shooting survival game. The first device 320 is a device used by a first user, the first user uses the first device 320 to control a first virtual object in the virtual environment to perform a movement, and the movement includes, but is not limited to, at least one of body posture adjustment, crawling, walking, running, cycling, jumping, driving, picking, shooting, attacking, and throwing. For example, the first virtual object is a first virtual character, such as a simulated character role or a cartoon character role.

The first device 320 is connected to the server 340 by using a wireless network or a wired network.

The server 340 includes at least one of one server, a plurality of servers, a cloud computing platform, and a virtualization center. The server 340 is configured to provide a backend service for an application program supporting a three-dimensional virtual environment. In some embodiments, the server 340 takes on primary computing work, the first device 320 and the second device 360 take on secondary computing work; alternatively, the server 340 takes on the secondary computing work, and the first device 320 and the second device 360 take on the primary computing work; alternatively, collaborative computing is performed by using a distributed computing architecture among the server 340, the first device 320, and the second device 360.

An application program supporting a virtual environment is installed and run on the second device 360. The application program may be any one of a VR application program, a three-dimensional map program, a military simulation program, an FPS game, a MOBA game, and a multiplayer shooting survival game. The second device 360 is a device used by a second user, the second user uses the second device 360 to control a second virtual object in the virtual environment to move, and the movement includes, but is not limited to, at least one of body posture adjustment, crawling, walking, running, cycling, jumping, driving, picking, shooting, attacking, and throwing. For example, the second virtual object is a second virtual character, such as a simulated character role or a cartoon character role.

In some embodiments, the first virtual character and the second virtual character are located in the same virtual environment. In some embodiments, the first virtual character and the second virtual character may belong to the same team or the same organization, have a friend relationship, or have a temporary communication permission. In some embodiments, the first virtual character and the second virtual character may alternatively belong to different teams, different organizations, or two groups hostile to each other.

In some embodiments, the application programs mounted on the first device 320 and the second device 360 are the same, or the application programs mounted on the two devices are the same type of application programs of different control system platforms. The first device 320 may generally refer to one of a plurality of devices, the second device 360 may generally refer to one of a plurality of devices. In this embodiment, a description is made by using only the first device 320 and the second device 360 as an example. The type of the first device 320 and the type of the second device 360 may be the same or may be different. The device type includes at least one of a game console, a desktop computer, a smartphone, a tablet computer, an ebook reader, an MP3 player, an MP4 player, and a laptop computer. In the following embodiments, a description is made by using an example in which the device is a desktop computer.

A person skilled in the art may learn that there may be more or fewer devices. For example, there may be only one device, or there may be dozens of or hundreds of or more devices. The quantity and the device type of the device are not limited in the embodiments of this application.

Figure 4:
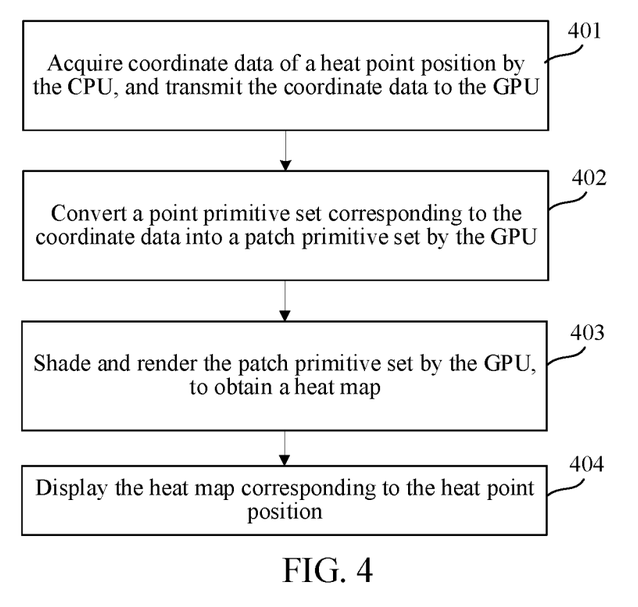
FIG. 4 is a flowchart of a method for displaying a heat map according to an exemplary embodiment of this application.

A method for displaying a heat map according to the embodiments of this application is described with reference to the foregoing brief introduction. FIG. 4 is a flowchart of a method for displaying a heat map according to an exemplary embodiment of this application. The method being applied to a terminal is used as an example for description. The terminal may be the terminal shown in FIG. 2 or the terminal in the system shown in FIG. 3 that includes at least one central processing unit (CPU) and at least one graphics processing unit (GPU) that is communicatively connected to the CPU. As shown in FIG. 4, the method includes the following steps:

Step 401. Acquire coordinate data of a heat point position by the CPU, and transmit the coordinate data to the GPU.

In an implementation, the CPU acquires the coordinate data of the heat point position, and transmits the coordinate data to the GPU.

The heat point position is used for representing a historical position corresponding to a virtual object, the historical position including at least one of a historical position of the virtual object in a virtual environment and a historical operation position for controlling the virtual object. That is, the heat point position is used for representing the historical position of the virtual object in the virtual environment, and/or used for representing the historical operation position for controlling the virtual object.

Schematically, for different application scenarios of the heat map, a method for acquiring the coordinate data of the heat point position is separately described using examples.

First, if the heat map is used for representing a blocking arrangement of a target virtual object in the virtual environment, historical blocking coordinate data of the target virtual object in the virtual environment is acquired, the historical blocking coordinate data including blocking coordinates of the target virtual object in at least one virtual battle round.

Schematically, blocking coordinate data of the target virtual object in n virtual battle rounds is acquired. When blocking coordinates in each virtual battle round are acquired, position coordinates of the target virtual object in the virtual environment are acquired every specified duration.

Second, if the heat map is used for representing distribution of the virtual objects in the virtual environment, coordinate data of positions of the virtual objects in the virtual environment is acquired.

In an implementation, the heat map may be used for representing distribution of all virtual objects in the virtual environment, or distribution of some virtual objects in the virtual environment. Schematically, the heat map is used for representing distribution of virtual objects of the same type in the virtual environment, for example, distribution of virtual objects in the hostile camp relative to the target virtual object in the virtual environment.

Third, if the heat map is used for representing distribution of click/tap events received by a user interface (UI), each time the UI receives a click/tap event, coordinates corresponding to a position in which the click/tap event is generated in the UI are acquired.

In some embodiments, when the UI is an interface displayed on a terminal equipped with a touch display screen, the click/tap operation may be implemented as a touch operation received on the touch display screen. The terminal may be implemented as a mobile terminal such as a mobile phone, a tablet computer, a portable laptop computer, or a smart wearable device. When the UI is an interface displayed on a desktop computer, the click/tap operation may be implemented as a click operation performed by using an external input device such as a mouse.

In an implementation, after acquiring the coordinate data of the heat point position, the CPU transmits the coordinate data as a point primitive set to the GPU for further processing. In some embodiments, after acquiring the coordinate data, the CPU stores the coordinate data in an array, abstracts the array as an array of point primitives, and transfers the array of the point primitives to the GPU through a Unity's Mesh interface.

Figure 5:
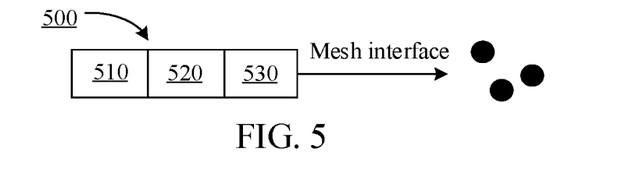
FIG. 5 is a schematic diagram of a point primitive transferring process according to the embodiment shown in FIG. 4.

Schematically, FIG. 5 is a schematic diagram of a point primitive transferring process according to the embodiment shown in FIG. 4. As shown in FIG. 5, an array 500 includes coordinates 510, coordinates 520, and coordinates 530. After the array 500 is abstracted as an array of point primitives, the array of point primitives is transferred to the GPU through the Mesh interface, and point primitives respectively corresponding to the coordinates 510, the coordinates 520, and the coordinates 530 are formed on the GPU.

Step 402. Convert the point primitive set corresponding to the coordinate data into a patch primitive set by the GPU, the patch primitive set including patch primitives corresponding to the coordinate data, the patch primitives being used for combining to generate a heat point region in the heat map.

In an implementation, the point primitives in the point primitive set are converted into the patch primitives by using a geometry shader on the GPU, to obtain the patch primitive set. The point primitives in the point primitive set are determined by using the coordinate data of the heat point position, that is, the point primitives corresponding to the coordinate data are converted into the patch primitives in the heat map.

Figure 6:
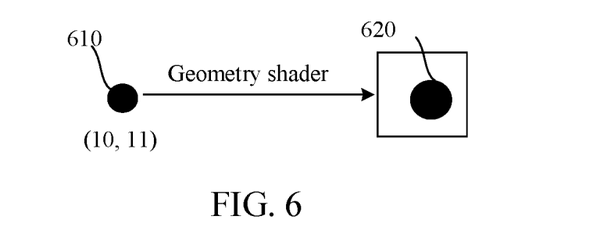
FIG. 6 is a schematic diagram of a process of converting a point primitive into a patch primitive according to the embodiment shown in FIG. 4.

In an implementation, when a point primitive is converted into a patch primitive, the point primitive is converted into a patch primitive of a preset shape according to a preset conversion rule of the geometry shader, for example, the point primitive is converted into a circular patch primitive. Schematically, FIG. 6 is a schematic diagram of a process of converting a point primitive into a patch primitive according to the embodiment shown in FIG. 4. As shown in FIG. 6, a point primitive 610 corresponds to coordinates (10, 11), and the point primitive 610 is converted by using the geometric shader to obtain a patch primitive 620.

Step 403. Shade and render the patch primitive set by the GPU, to obtain the heat map.

In an implementation, a grayscale map corresponding to the patch primitive set is obtained by the GPU, and the grayscale map is shaded by using a shader, to obtain a color heat map corresponding to the heat point position.

In an implementation, translucence processing is performed on the patch primitive set by the GPU, to obtain the grayscale map, and then the grayscale map is shaded.

Step 404. Display the heat map corresponding to the heat point position.

In an implementation, the heat map may be superimposed and displayed on a schematic diagram corresponding to a heat event, for example, when the heat event is used for representing blocking distribution of the virtual object in the virtual environment, the heat map is superimposed and displayed on a map corresponding to the virtual environment.

In conclusion, in the method for displaying a heat map provided in this embodiment, after coordinate data of a heat point position is confirmed by the CPU, the point primitives corresponding to the coordinate data are transmitted to the GPU. The GPU converts the point primitive set corresponding to the coordinate data to obtain a corresponding patch primitive set. After the patch primitive set is shaded and rendered, the heat map is obtained and displayed, so that in a process of calculating and rendering the heat map, most operations are transferred to the GPU, thereby reducing calculation pressure of the CPU, and releasing computing resources of the CPU for other program logic to use.

Figure 7:
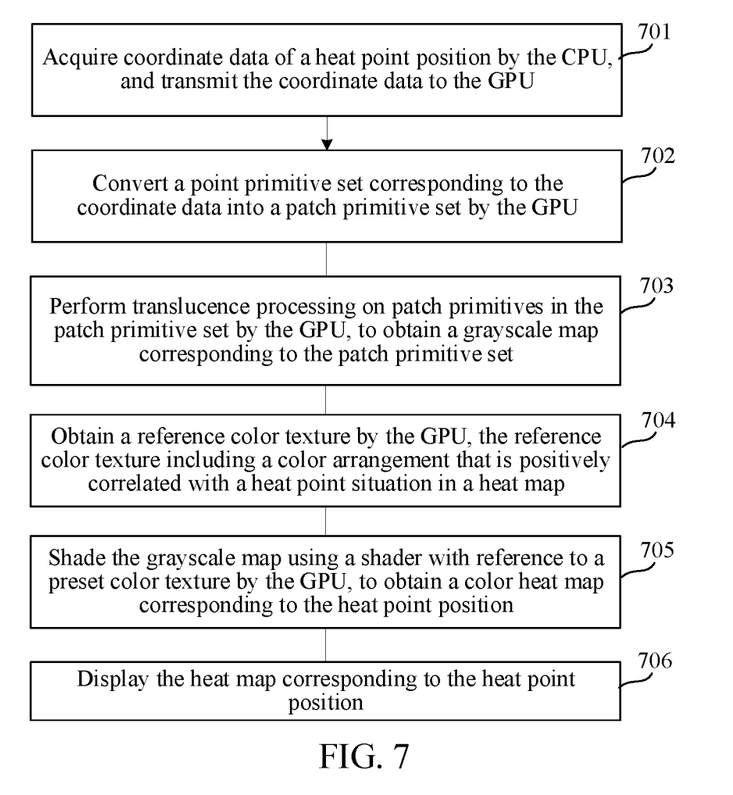
FIG. 7 is a flowchart of a method for displaying a heat map according to another exemplary embodiment of this application.

In an exemplary embodiment, during shading and rendering of the patch primitives, a grayscale map corresponding to the patch primitives is first obtained, and the grayscale map is shaded by using the shader, to obtain the color heat map. FIG. 7 is a flowchart of a method for displaying a heat map according to another exemplary embodiment of this application. The method being applied to a terminal is used as an example for description. The terminal may be the terminal shown in FIG. 2 or the terminal in the system shown in FIG. 3. As shown in FIG. 7, the method includes the following steps:

Step 701. Acquire coordinate data of a heat point position by the CPU, and transmit the coordinate data to the GPU.

In an implementation, the CPU acquires the coordinate data of the heat point position, and transmits the coordinate data to the GPU.

Schematically, for different application scenarios of the heat map, a method for acquiring the coordinate data of the heat point position is separately described using examples.

First, if the heat map is used for representing a blocking arrangement of a target virtual object in a virtual environment, historical blocking coordinate data of the target virtual object in the virtual environment is acquired, the historical blocking coordinate data including blocking coordinates of the target virtual object in at least one virtual battle round.

Second, if the heat map is used for representing distribution of the virtual objects in the virtual environment, coordinate data of positions of the virtual objects in the virtual environment is acquired.

Third, if the heat map is used for representing distribution of click/tap events received by a UI, each time the UI receives a click/tap event, coordinates corresponding to a position in which the click/tap event is generated in the UI are acquired.

In an implementation, after acquiring the coordinate data of the heat point position, the CPU transmits the coordinate data as a point primitive set to the GPU for further processing.

Alternatively, in another possible implementation, after acquiring the coordinate data, the CPU stores the coordinate data in an array, abstracts array information as an array of point primitives, and transfers the array of the point primitives to the GPU through a Unity's Mesh interface.

Step 702. Convert a point primitive set corresponding to the coordinate data into a patch primitive set by the GPU.

In an implementation, the point primitives in the point primitive set are converted into the patch primitives by using a geometry shader on the GPU, to obtain the patch primitive set. The point primitives in the point primitive set are determined by using the coordinate data of the heat point position, that is, the point primitives corresponding to the coordinate data are converted into the patch primitives in the heat map.

Step 703. Perform translucence processing on the patch primitives in the patch primitive set by the GPU, to obtain the grayscale map corresponding to the patch primitive set.

In an implementation, the patch primitive set is rendered by using a translucence formula (One, OneMinusSrcAlpha) onto a render target of off-screen rendering to form a grayscale heat map.

Step 704. Obtain a reference color texture by the GPU, the reference color texture including a color arrangement that is positively correlated with a heat point situation in the heat map.

In an implementation, the reference color texture is used for representing, by using the color arrangement, that a region corresponding to heat point positions in a current heat map is a region with a higher degree of being a heat point. Therefore, the heat point region is expressed with reference to the expression of the reference color texture. In some embodiments, when the grayscale map is shaded by using the reference color texture, according to the color arrangement in the reference color texture, in a shading order from the inside to the outside, a center of the grayscale map is rendered with a color corresponding to a high degree of being a heat point, and an outer circle of the grayscale map is rendered with a color corresponding to a low degree of being a heat point, for example, the grayscale map is sequentially rendered with red, yellow, green, and blue from the center to the outer circle in a gradually changing form.

Step 705. Shade the grayscale map using the shader with reference to a preset color texture by the GPU, to obtain a color heat map corresponding to the heat point position.

In an implementation, a fragment shader is made. A brightest region corresponds to a texture coordinate 0, a darkest region corresponds to a texture coordinate 1, and a reference color texture is set correspondingly, for example, red corresponds to the texture coordinate 0, and blue corresponds to the texture coordinate 1. Color rendering is performed, with the help of the fragment shader, on the grayscale map formed on the render target, to obtain the color heat map.

Figure 8:
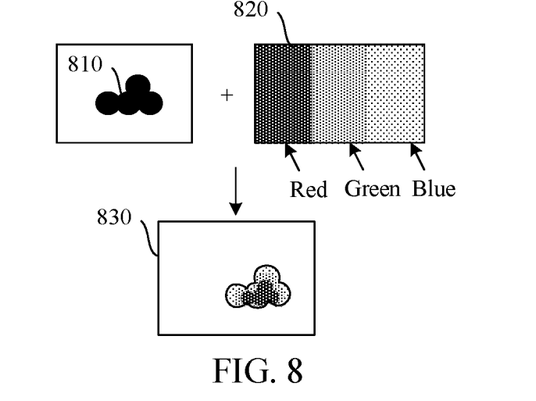
FIG. 8 is a schematic diagram of a process of shading a grayscale map according to the embodiment shown in FIG. 7.

Schematically, FIG. 8 is a schematic diagram of a process of shading a grayscale map according to the embodiment shown in FIG. 7. As shown in FIG. 8, a grayscale map 810 is shaded with reference to a color texture 820, to obtain a color heat map 830.

Step 706. Display the heat map corresponding to the heat point position.

In an implementation, the heat map may be superimposed and displayed on a schematic diagram corresponding to a heat event, for example, when the heat event is used for representing blocking distribution of the virtual object in the virtual environment, the heat map is superimposed and displayed on a map corresponding to the virtual environment.

In conclusion, in the method for displaying a heat map provided in this embodiment, after coordinate data of a heat point position is confirmed by the CPU, the point primitives corresponding to the coordinate data are transmitted to the GPU. The GPU converts the point primitive set corresponding to the coordinate data to obtain a corresponding patch primitive set. After the patch primitive set is shaded and rendered, the heat map is obtained and displayed, so that in a process of calculating and rendering the heat map, most operations are transferred to the GPU, thereby reducing calculation pressure of the CPU, and releasing computing resources of the CPU for other program logic to use.

In the method provided in this embodiment, translucence processing is performed on the patch primitives by the GPU to obtain the grayscale map, and the grayscale map is correspondingly shaded to obtain the color heat map, so as to calculate and render the heat map by the GPU, release computing resources of the CPU for other program logic to use, and improve an operating speed of the terminal.

Figure 9:
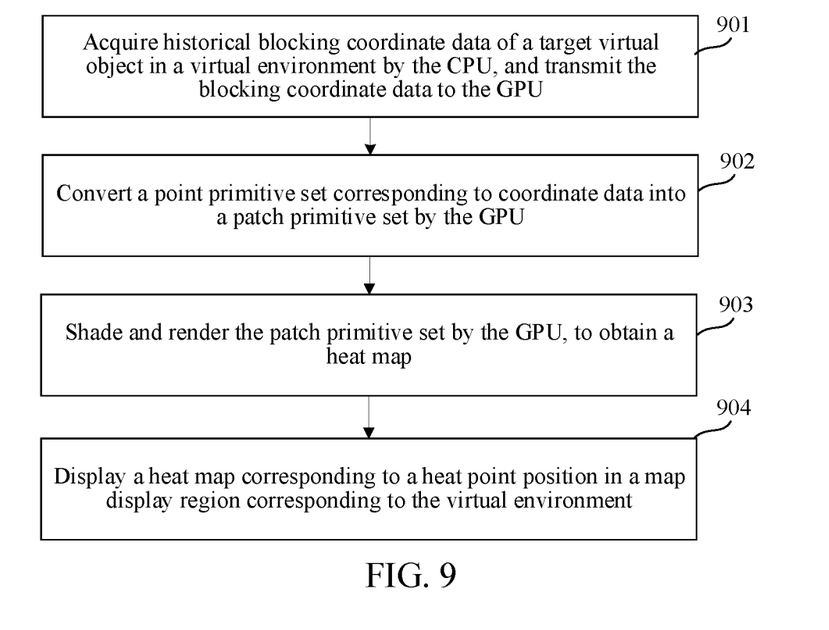
FIG. 9 is a flowchart of a method for displaying a heat map according to another exemplary embodiment of this application.

In an exemplary embodiment, the heat map involved in this application is used for representing a blocking arrangement of a target virtual object in a virtual environment. FIG. 9 is a flowchart of a method for displaying a heat map according to another exemplary embodiment of this application. The description is made with reference to an example that the method is applied to a terminal. As shown in FIG. 9, the method includes:

Step 901. Acquire historical blocking coordinate data of the target virtual object in the virtual environment by the CPU, and transmit the blocking coordinate data to the GPU, the historical blocking coordinate data including blocking coordinates of the target virtual object in at least one virtual battle round.

In an implementation, the target virtual object is one or more virtual objects created by a target account. In this embodiment of this application, a description is made by using an example in which the target virtual object is one of the virtual objects created by the target account. Before the historical blocking coordinate data of the target virtual object is acquired, a heat map query interface is first displayed, the heat map query interface being used for querying for a blocking heat map of a virtual object corresponding to the target account in the virtual environment, and the heat map query interface including at least one candidate virtual object.

A selection operation performed on the target virtual object is received in the heat map query interface, the selection operation being used for querying for the blocking heat map of the target virtual object, and the historical blocking coordinate data of the target virtual object in the virtual environment is acquired according to the selection operation.

In an implementation, the heat map query interface may alternatively be used for querying for a blocking heat map of a virtual object participating in a target battle in the virtual environment, the heat map query interface including at least one candidate virtual object. A selection operation performed on the target virtual object is received in the heat map query interface, and historical blocking coordinate data of the target virtual object in one or more specific battles in the virtual environment is acquired according to the selection operation, that is, blocking coordinate data of the target virtual object in the target battle is acquired.

In an implementation, the blocking coordinate data may be acquired in real time during the target battle, or may be acquired after the target battle is over.

In an implementation, position information of the target virtual object in the virtual environment is acquired every specified duration, to obtain the historical blocking coordinate data.

In an implementation, the position information of the target virtual object in at least one virtual battle round is acquired. The position information may be information acquired every specified duration in a complete virtual battle, or may be information acquired every specified duration for a key time period in a virtual battle, for example, information acquired every specified duration from the 10$^{th}$ minute to the 20$^{th}$ minute in the virtual battle.

Figure 10:
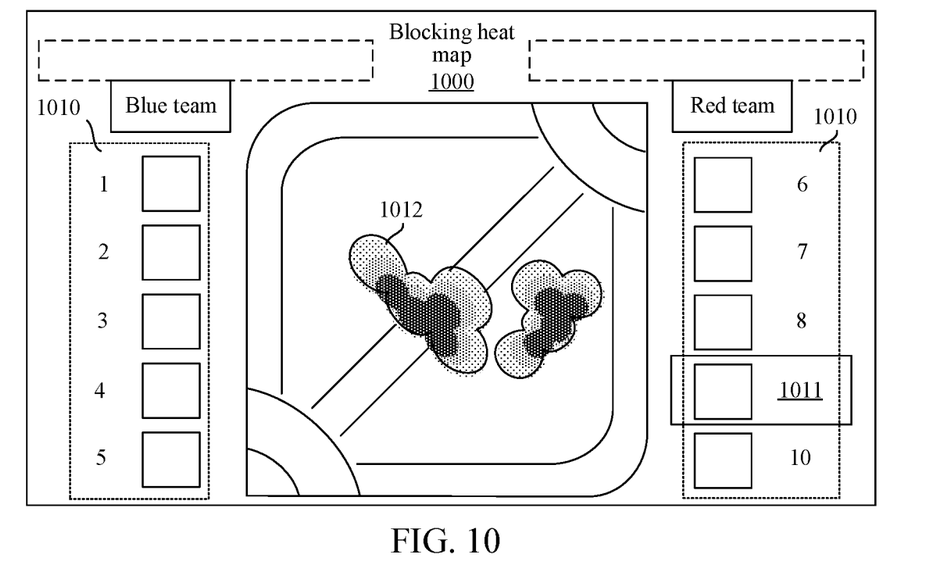
FIG. 10 is a schematic interface diagram of a heat map query interface according to the embodiment shown in FIG. 9.

Schematically, FIG. 10 is a schematic interface diagram of a heat map query interface according to the embodiment shown in FIG. 9. As shown in FIG. 10, a heat map query interface 1000 includes at least one candidate virtual object 1010, which includes a target virtual object 1011. After a selection operation performed on the target virtual object is received, a blocking heat map 1012 corresponding to the target virtual object 1011 is displayed on a map.

Step 902. Convert a point primitive set corresponding to the blocking coordinate data into a patch primitive set by the GPU.

In an implementation, the point primitives in the point primitive set are converted into the patch primitives by using a geometry shader on the GPU, to obtain the patch primitive set. The point primitives in the point primitive set are determined by using the coordinate data of the heat point position, that is, the point primitives corresponding to the coordinate data are converted into the patch primitives in the heat map.

Step 903. Shade and render the patch primitive set by the GPU, to obtain the heat map.

In an implementation, a grayscale map corresponding to the patch primitive set is obtained by the GPU, and the grayscale map is shaded by using a shader, to obtain a color heat map corresponding to the heat point position.

In an implementation, translucence processing is performed on the patch primitive set by the GPU, to obtain the grayscale map, and then the grayscale map is shaded.

Step 904. Display a heat map corresponding to the heat point position in a map display region corresponding to the virtual environment.

In conclusion, in the method for displaying a heat map provided in this embodiment, after coordinate data of a heat point position is confirmed by the CPU, the point primitives corresponding to the coordinate data are transmitted to the GPU. The GPU converts the point primitive set corresponding to the coordinate data to obtain a corresponding patch primitive set. After the patch primitive set is shaded and rendered, the heat map is calculated and displayed, so that in a process of calculating and rendering the heat map, most operations are transferred to the GPU, thereby reducing calculation pressure of the CPU, and releasing computing resources of the CPU for other program logic to use.

In the method provided in this embodiment, a corresponding heat map is displayed for a blocking arrangement of the virtual object in the virtual battle, so as to intuitively reflect a blocking situation of the target virtual object. In addition, during rendering of the heat map, the GPU is used for performing operations, thereby releasing resources of the CPU for game logic operations and improving an operating speed of the terminal.

Figure 11:
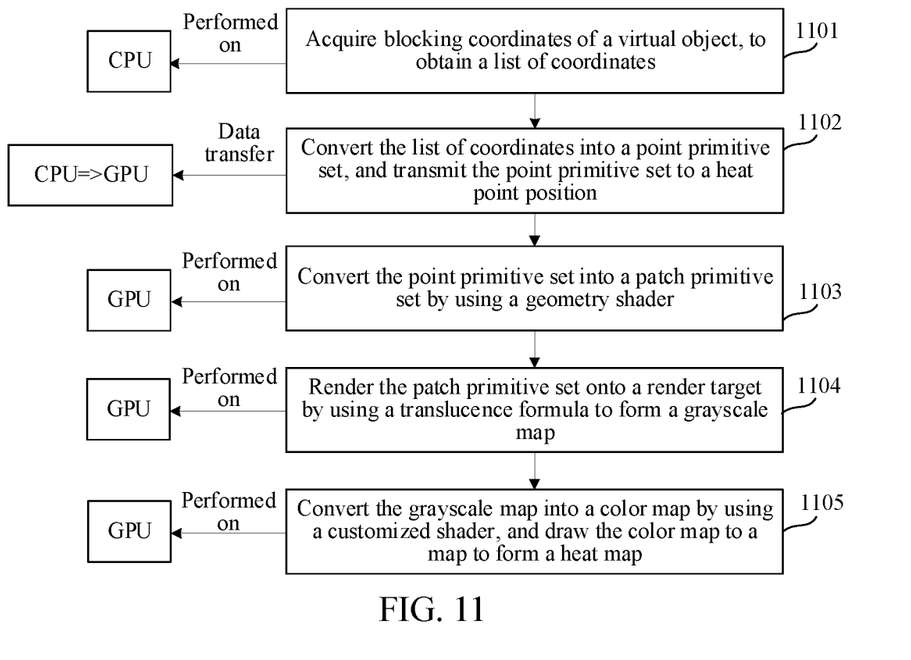
FIG. 11 is a schematic diagram of a process of rendering a heat map according to another exemplary embodiment of this application.

Schematically, FIG. 11 is a schematic diagram of a process of rendering a heat map according to another exemplary embodiment of this application. An example in which the process is applied to a process of analyzing a blocking arrangement of a virtual object is used. As shown in FIG. 11, the process includes:

Step 1101. Acquire blocking coordinates of the virtual object by the CPU, to obtain a list of coordinates.

Schematically, a description is made by using an example in which a virtual battle is in progress. Blocking coordinates of the virtual object are acquired in the latest specified duration, for example, blocking coordinates of the virtual object are acquired in the latest 10 minutes, and blocking coordinates of the virtual object in the virtual environment are acquired every 5 seconds.

Step 1102. Convert the list of coordinates into a point primitive set by the CPU, and transfer the point primitive set to the GPU.

In an implementation, after acquiring coordinate data, the CPU converts the list of coordinates into the point primitive set, and transfers the point primitive set to the GPU for subsequent processing.

Step 1103. Convert the point primitive set into a patch primitive set by using a geometry shader.

In an implementation, the point primitive set is converted into the patch primitive set by using the geometry shader in the GPU.

Step 1104. Render the patch primitive set onto a render target by using a translucence formula to form a grayscale map.

In an implementation, the patch primitive set is rendered onto the render target by using the translucence formula (One, OneMinusSrcAlpha) to form the grayscale map.

Step 1105. Convert the grayscale map into a color map by using a customized shader, and draw the color map to a map to form the heat map.

Figure 12:
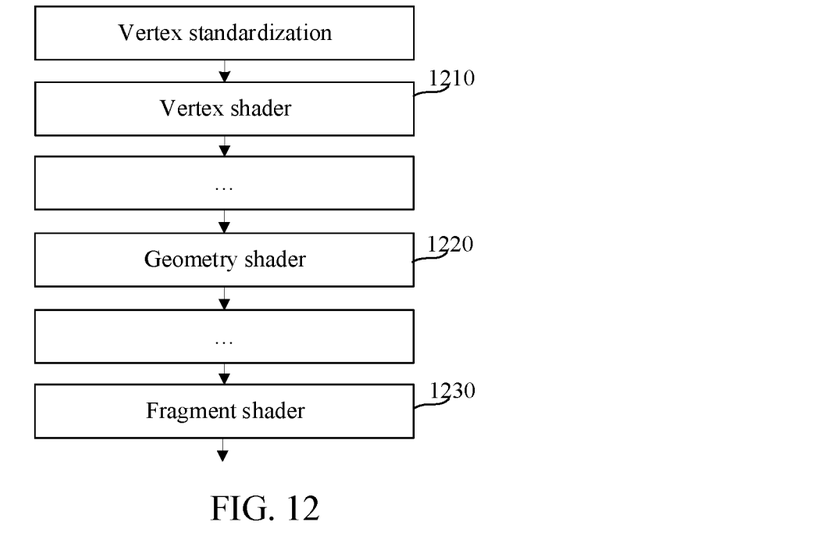
FIG. 12 is a schematic structural diagram of using a GPU graphics rendering pipeline according to an exemplary embodiment of this application.

Schematically, FIG. 12 is a schematic structural diagram of using a GPU graphics rendering pipeline according to an exemplary embodiment of this application. As shown in FIG. 12, during rendering of a heat map, a vertex shader 1210, a geometry shader 1220, and a fragment shader 1230 in the GPU graphics rendering pipeline are used.

In conclusion, in the method for displaying a heat map provided in this embodiment, after coordinate data of a heat point position is confirmed by the CPU, the point primitives corresponding to the coordinate data are transmitted to the GPU. The GPU converts the point primitive set corresponding to the coordinate data to obtain a corresponding patch primitive set. After the patch primitive set is shaded and rendered, the heat map is obtained and displayed, so that in a process of calculating and rendering the heat map, most operations are transferred to the GPU, thereby reducing calculation pressure of the CPU, and releasing computing resources of the CPU for other program logic to use.

Figure 13:
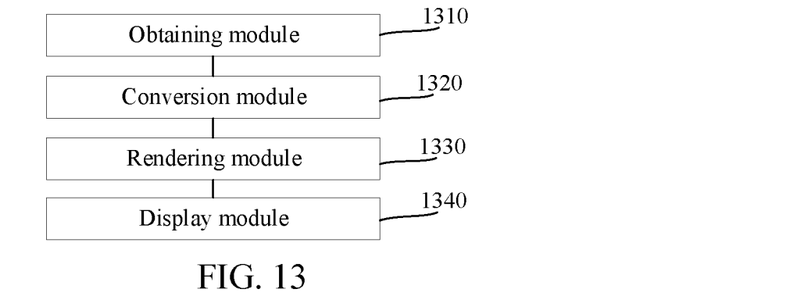
FIG. 13 is a structural block diagram of an apparatus for displaying a heat map according to an exemplary embodiment of this application.

FIG. 13 is a structural block diagram of an apparatus for displaying a heat map according to an exemplary embodiment of this application. The apparatus being applied to a terminal is used as an example for description. The terminal may be the terminal shown in FIG. 2 or the terminal in the system shown in FIG. 3. As shown in FIG. 13, the apparatus includes:

an obtaining module 1310, configured to acquire coordinate data of a heat point position, and transmit the coordinate data to a GPU;

a conversion module 1320, configured to convert a point primitive set corresponding to the coordinate data into a patch primitive set by the GPU, the patch primitive set including patch primitives corresponding to the coordinate data, the patch primitives being used for combining to generate a heat point region in a heat map;

a rendering module 1330, configured to shade and render the patch primitive set by the GPU, to obtain a heat map; and a display module 1340, configured to display the heat map corresponding to the heat point position.

In an exemplary embodiment, the obtaining module 1310 is further configured to obtain a grayscale map corresponding to the patch primitive set by the GPU; and the rendering module 1330 is further configured to shade the grayscale map by using a shader, to obtain a color heat map corresponding to the heat point position.

In an exemplary embodiment, the obtaining module 1310 is further configured to obtain a grayscale map corresponding to the patch primitive set by the GPU; and the rendering module 1330 is further configured to shade the grayscale map by using a shader, to obtain a color heat map corresponding to the heat point position.

In an exemplary embodiment, the obtaining module 1310 is further configured to perform translucence processing on patch primitives in the patch primitive set by the GPU, to obtain the grayscale map corresponding to the patch primitive set.

In an exemplary embodiment, the obtaining module 1310 is further configured to obtain a reference color texture, the reference color texture including a color arrangement that is positively correlated with a heat point situation in the heat map; and the rendering module 1330 is further configured to shade the grayscale map by using a shader with reference to the reference color texture, to obtain the color heat map corresponding to the heat point position.

In an exemplary embodiment, the heat map is used for representing a blocking arrangement of a target virtual object in a virtual environment; and the obtaining module 1310 is further configured to acquire historical blocking coordinate data of the target virtual object in the virtual environment, the historical blocking coordinate data including blocking coordinates of the target virtual object in at least one virtual battle round.

In an exemplary embodiment, the obtaining module 1310 is further configured to acquire position information of the target virtual object in the virtual environment at each predefined duration, to obtain the historical blocking coordinate data.

In an exemplary embodiment, the display module 1340 is further configured to display a heat map query interface, the heat map query interface being used for querying for a blocking heat map of a virtual object participating in a target battle in the virtual environment, and the heat map query interface including at least one candidate virtual object.

Figure 14:
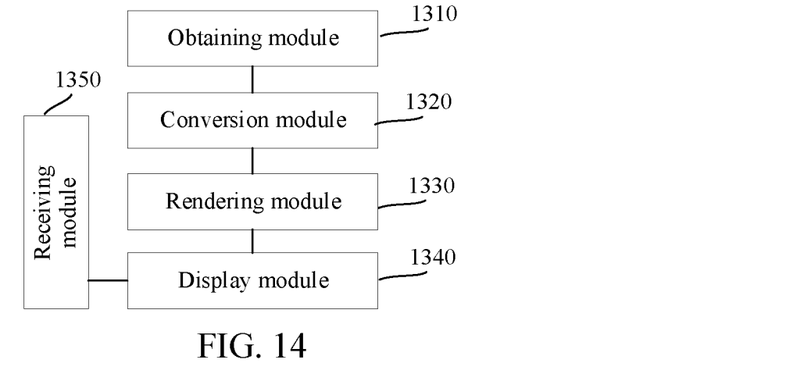
FIG. 14 is a structural block diagram of an apparatus for displaying a heat map according to another exemplary embodiment of this application.

As shown in FIG. 14, the apparatus further includes:

a receiving module 1350, configured to receive a selection operation performed on the target virtual object in the heat map query interface, the selection operation being used for querying for the blocking heat map of the target virtual object.

In an exemplary embodiment, the display module 1340 is further configured to display the heat map corresponding to the heat point position in a map display region corresponding to the virtual environment.

In conclusion, in the apparatus for displaying a heat map provided in this embodiment, after only coordinate data of a heat point position needs to be confirmed by the CPU, the point primitives corresponding to the coordinate data are transmitted to the GPU. The GPU converts the point primitive set corresponding to the coordinate data to obtain a corresponding patch primitive set. After the patch primitive set is shaded and rendered, the heat map is obtained and displayed, so that in a process of calculating and rendering the heat map, most operations are transferred to the GPU, thereby reducing calculation pressure of the CPU, and releasing computing resources of the CPU for other program logic to use.

The apparatus for displaying a heat map provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described in the above embodiments. In addition, embodiments of the apparatus for displaying a heat map and the method for displaying a heat map provided in the foregoing embodiments belong to the same concept. For the specific implementation process, reference may be made to the method embodiments, and details are not described herein again.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 15:
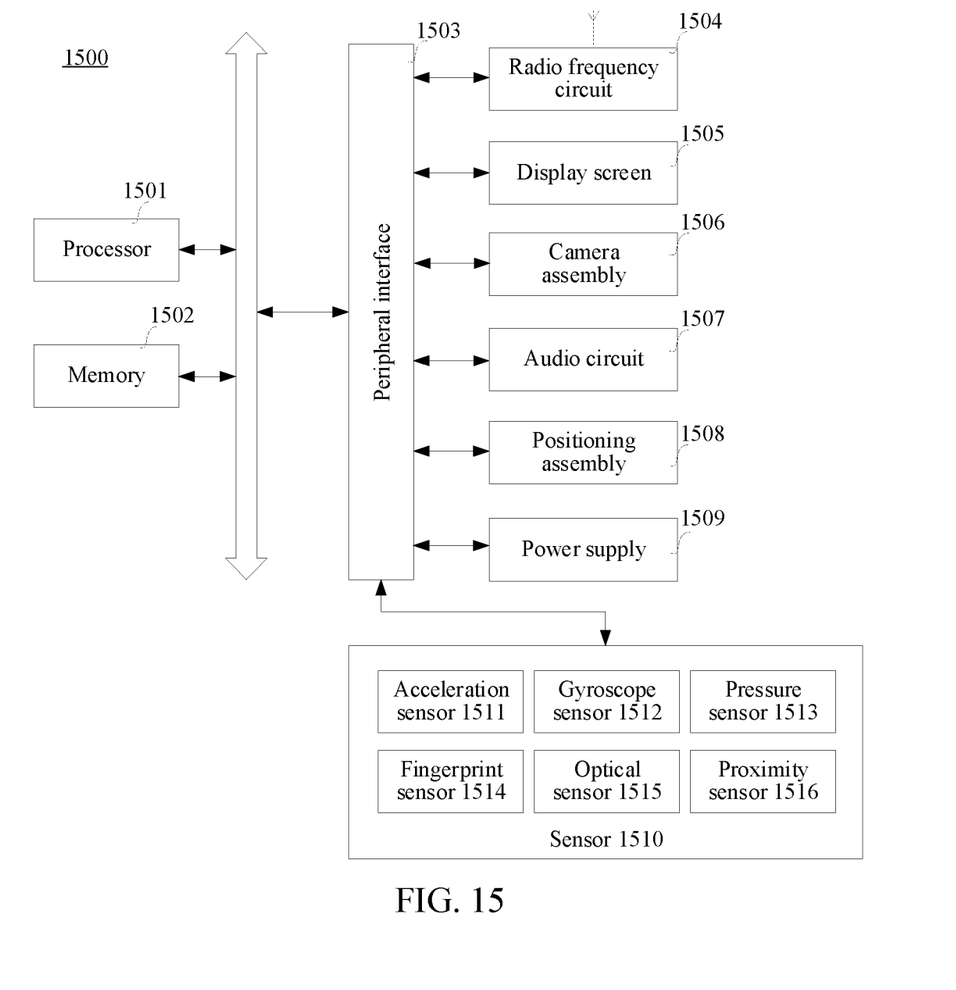
FIG. 15 is a structural block diagram of a terminal according to an exemplary embodiment of this application.

FIG. 15 shows a structural block diagram of a terminal 1500 according to an exemplary embodiment of this application. The terminal 1500 may be a smartphone, a tablet computer, an MP3 player, an MP4 player, a notebook computer, or a desktop computer. The terminal 1500 may also be referred to as user equipment, a portable terminal, a laptop terminal, a desktop terminal, or another name.

Generally, the terminal 1500 includes a processor 1501 and a memory 1502.

The processor 1501 may include one or more processing cores, and may be, for example, a 4-core processor or an 8-core processor. The processor 1501 may be implemented in at least one hardware form of a digital signal processor (DSP), a field-programmable gate array (FPGA), and a programmable logic array (PLA). The processor 1501 may alternatively include a main processor and a coprocessor. The main processor is a processor configured to process data in an awake state, also referred to as a CPU, and the coprocessor is a low-power processor configured to process data in a standby state. In some embodiments, the processor 1501 may be integrated with a GPU. The GPU is configured to be responsible for rendering and drawing content that a display screen needs to display. In some embodiments, the processor 1501 may further include an artificial intelligence (AI) processor. The AI processor is configured to process computing operations related to machine learning.

The memory 1502 may include one or more computer-readable storage medium. The computer-readable storage medium may be non-transient. The memory 1502 may further include a high-speed random access memory (RAM), and a non-volatile memory such as one or more magnetic disk storage devices and a flash storage device. In some embodiments, the non-transitory computer-readable storage medium in the memory 1502 is configured to store at least one instruction, and the at least one instruction being configured to be executed by the processor 1501 to implement the method for displaying a heat map provided in the method embodiments of this application.

In some embodiments, the terminal 1500 may alternatively include: a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. Specifically, the peripheral includes at least one of a radio frequency (RF) circuit 1504, a display screen 1505, a camera assembly 1506, an audio circuit 1507, a positioning assembly 1508, and a power supply 1509.

The peripheral interface 1503 may be configured to connect at least one peripheral related to input/output (I/O) to the processor 1501 and the memory 1502. In some embodiments, the processor 1501, the memory 1502, and the peripheral interface 1503 are integrated on a same chip or circuit board. In some other embodiments, any one or two of the processor 1501, the memory 1502, and the peripheral interface 1503 may be implemented on a separate chip or the circuit board. This is not limited in this embodiment.

The RF circuit 1504 is configured to receive and transmit an RF signal, also referred to as an electromagnetic signal. The RF circuit 1504 communicates with a communication network and another communication devices by using the electromagnetic signal. The RF circuit 1504 converts an electric signal into an electromagnetic signal for transmission, or converts a received electromagnetic signal into an electric signal. In some embodiments, the RF circuit 1504 includes an antenna system, an RF transceiver, one or more amplifiers, a tuner, an oscillator, a digital signal processor, a codec chip set, a subscriber identity module card, and the like. The RF circuit 1504 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a wireless fidelity (Wi-Fi) network. In some embodiments, the RF 1504 may further include a circuit related to near field communication (NFC), which is not limited in this application.

The display screen 1505 is configured to display a UI. The UI may include a graph, text, an icon, a video, and any combination thereof. In a case that the display screen 1505 is a touch display screen, the display screen 1505 further has a capability of acquiring a touch signal on or above a surface of the display screen 1505. The touch signal may be inputted into the processor 1501 as a control signal for processing. In this case, the display screen 1505 may be further configured to provide a virtual button and/or a virtual keyboard that are/is also referred to as a soft button and/or a soft keyboard. In some embodiments, there may be one display screen 1505, disposed on a front panel of the terminal 1500. In some other embodiments, there may be at least two display screens 1505, respectively disposed on different surfaces of the terminal 1500 or designed in a foldable shape. In some other embodiments, the display screen 1505 may be a flexible display screen, disposed on a curved surface or a folded surface of the terminal 1500. The display screen 1505 may be further set to have a non-rectangular irregular graph, that is, a special-shaped screen. The display screen 1505 may be prepared by using materials such as a liquid crystal display (LCD), an organic light-emitting diode (OLED), or the like.

The camera assembly 1506 is configured to acquire an image or a video. In some embodiments, the camera assembly 1506 includes a front-facing camera and a rear-facing camera. Generally, the front-facing camera is disposed on a front panel of the terminal, and the rear-facing camera is disposed on a rear surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and VR photographing through fusion of the main camera and the wide-angle camera, or other fusion photographing functions. In some embodiments, the camera assembly 1506 may further include a flash. The flash may be a single-color-temperature flash, or may be a double-color-temperature flash. The double-color-temperature flash is a combination of a warm light flash and a cold light flash, and may be used for light compensation under different color temperatures.

The audio circuit 1507 may include a microphone and a speaker. The microphone is configured to collect sound waves of a user and an environment, and convert the sound waves into electrical signals and input the electrical signals into the processor 1501 for processing, or input the electrical signals into the RF circuit 1504 to implement voice communication. For the purpose of stereo collection or noise reduction, there may be a plurality of microphones, disposed at different portions of the terminal 1500 respectively. The microphone may be further an array microphone or an omni-directional collection type microphone. The speaker is configured to convert electric signals from the processor 1501 or the RF circuit 1504 into sound waves. The speaker may be a conventional thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 1507 may further include an earphone jack.

The positioning assembly 1508 is configured to determine a current geographic location of the terminal 1500, to implement a navigation or a location based service (LBS). The positioning assembly 1508 may be a positioning assembly based on the Global Positioning System (GPS) of the United States, the BeiDou system of China, or the GALILEO System of the European Union.

The power supply 1509 is configured to supply power to components in the terminal 1500. The power supply 1509 may be an alternating current, a direct current, a primary battery, or a rechargeable battery. When the power supply 1509 includes a rechargeable battery, the rechargeable battery may be a wired rechargeable battery or a wireless rechargeable battery. The wired charging battery is a battery charged through a wired line, and the wireless charging battery is a battery charged through a wireless coil. The rechargeable battery may be further configured to support a quick charge technology.

In some embodiments, the terminal 1500 further includes one or more sensors 1510. The one or more sensors 1510 include, but are not limited to, an acceleration sensor 1511, a gyroscope sensor 1512, a pressure sensor 1513, a fingerprint sensor 1514, an optical sensor 1515, and a proximity sensor 1516.

The acceleration sensor 1511 may detect a magnitude of acceleration on three coordinate axes of a coordinate system established with the terminal 1500. For example, the acceleration sensor 1511 may be configured to detect components of gravity acceleration on the three coordinate axes. The processor 1501 may control, according to a gravity acceleration signal collected by the acceleration sensor 1511, the display screen 1505 to display the UI in a landscape view or a portrait view. The acceleration sensor 1511 may be further configured to acquire motion data of a game or a user.

The gyroscope sensor 1512 may detect a body direction and a rotation angle of the terminal 1500. The gyroscope sensor 1512 may cooperate with the acceleration sensor 1511 to acquire a 3D action by the user on the terminal 1500. The processor 1501 may implement the following functions according to the data acquired by the gyroscope sensor 1512: motion sensing (such as changing the UI according to a tilt operation of the user), image stabilization at shooting, game control, and inertial navigation.

The pressure sensor 1513 may be disposed at a side frame of the terminal 1500 and/or a lower layer of the display screen 1505. When the pressure sensor 1513 is disposed at the side frame of the terminal 1500, a holding signal of the user on the terminal 1500 may be detected. The processor 1501 performs left and right hand recognition or a quick operation according to the holding signal acquired by the pressure sensor 1513. When the pressure sensor 1513 is disposed on the low layer of the display screen 1505, the processor 1501 controls, according to a pressure operation of the user on the display screen 1505, an operable control on the UI. The operable control includes at least one of a button control, a scroll-bar control, an icon control, and a menu control.

The fingerprint sensor 1514 is configured to acquire a user's fingerprint, and the processor 1501 identifies a user's identity according to the fingerprint acquired by the fingerprint sensor 1514, or the fingerprint sensor 1514 identifies a user's identity according to the acquired fingerprint. When identifying that the identity of the user is a trusted identity, the processor 1501 authorizes the user to perform related sensitive operations. The sensitive operations include: unlocking a screen, viewing encrypted information, downloading software, paying, changing a setting, and the like. The fingerprint sensor 1514 may be disposed on a front surface, a back surface, or a side surface of the terminal 1500. When a physical button or a vendor logo is disposed on the terminal 1500, the fingerprint sensor 1514 may be integrated with the physical button or the vendor logo.

The optical sensor 1515 is configured to acquire ambient light intensity. In an embodiment, the processor 1501 may control display luminance of the display screen 1505 according to the ambient light intensity collected by the optical sensor 1515. Specifically, when the ambient light intensity is relatively high, the display luminance of the display screen 1505 is increased. When the ambient light intensity is relatively low, the display luminance of the display screen 1505 is reduced. In another embodiment, the processor 1501 may further dynamically adjust a camera parameter of the camera assembly 1506 according to the ambient light intensity acquired by the optical sensor 1515.

The proximity sensor 1516, also referred to as a distance sensor, is generally disposed on the front panel of the terminal 1500. The proximity sensor 1516 is configured to acquire a distance between the user and the front surface of the terminal 1500. In an embodiment, when the proximity sensor 1516 detects that the distance between the user and the front surface of the terminal 1500 gradually becomes smaller, the display screen 1505 is controlled by the processor 1501 to switch from a screen-on state to a screen-off state. In a case that the proximity sensor 1516 detects that the distance between the user and the front surface of the terminal 1500 gradually becomes larger, the display screen 1505 is controlled by the processor 1501 to switch from the screen-off state to the screen-on state.

A person skilled in the art may understand that the structure shown in FIG. 15 constitutes no limitation on the terminal 1500, and the terminal may include more or fewer components than those shown in the figure, or some components may be combined, or a different component deployment may be used.

In some embodiments, the computer-readable storage medium may include: a read-only memory (ROM), a RAM, a solid state drive (SSD), an optical disc, or the like. The RAM may include a resistance random access memory (ReRAM) and a dynamic random access memory (DRAM). The sequence numbers of the foregoing embodiments of this application are merely for description purposes, and are not intended to indicate the preference among the embodiments.

In an exemplary embodiment, this application further provides a computer-readable storage medium, storing at least one computer program, and the at least one computer program being loaded and executed by a processor to implement the method for displaying a heat map provided in the foregoing method embodiments.

In an exemplary embodiment, a computer program product or a computer program is further provided. The computer program product or the computer program includes computer instructions, and the computer instructions are stored on a computer-readable storage medium. A processor of the computer device reads the computer instructions from the computer-readable storage medium and executes the computer instructions to cause the computer device to perform the method for displaying a heat map provided in the foregoing method embodiments.

A person of ordinary skill in the art may understand that all or some of the steps of the foregoing embodiments may be implemented by hardware, or may be implemented by a program instructing related hardware. The program may be stored on a computer-readable storage medium. The storage medium may be a ROM, a magnetic disk, or an optical disc.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for displaying heat maps performed at a computer device including at least one central processing unit (CPU) and at least one graphics processing unit (GPU) that is communicatively connected to the CPU, the method comprising:

acquiring coordinate data of a heat point position by the CPU, and transmitting the coordinate data from the CPU to the GPU, wherein acquiring the coordinate data of the heat point position by the CPU comprises acquiring historical blocking coordinate data of a target virtual object in a virtual environment, the historical blocking coordinate data comprising blocking coordinates of the target virtual object in at least one virtual battle round;

converting a point primitive set corresponding to the coordinate data into a patch primitive set by the GPU, the patch primitive set comprising patch primitives corresponding to the coordinate data, the patch primitives being combined to generate a heat point region corresponding to the coordinate data in a heat map, wherein the heat map is used for representing a blocking arrangement of the target virtual object in the virtual environment;

shading and rendering the patch primitive set by the GPU, to obtain the heat map; and displaying the heat map corresponding to the heat point position.

2. The method according to claim 1, wherein the shading and rendering the patch primitive set by the GPU, to obtain a heat map comprises:
- obtaining a grayscale map corresponding to the patch primitive set by the GPU; and
- shading the grayscale map using a shader by the GPU, to obtain a color heat map corresponding to the heat point position.

3. The method according to claim 2, wherein the obtaining a grayscale map corresponding to the patch primitive set by the GPU comprises:
- performing translucence processing on patch primitives in the patch primitive set by the GPU, to obtain the grayscale map corresponding to the patch primitive set.

4. The method according to claim 2, wherein the shading the grayscale map using a shader by the GPU, to obtain a color heat map corresponding to the heat point position comprises:
- obtaining a reference color texture, the reference color texture comprising a color arrangement that is positively correlated with a heat point situation in the heat map; and
- shading the grayscale map by using a shader with reference to the reference color texture, to obtain the color heat map corresponding to the heat point position.

5. The method according to claim 1, wherein the acquiring historical blocking coordinate data of the target virtual object in the virtual environment by the CPU comprises:
- acquiring position information of the target virtual object in the virtual environment at each predefined duration by the CPU, to obtain the historical blocking coordinate data.

6. The method according to claim 1, wherein before the acquiring historical blocking coordinate data of the target virtual object in the virtual environment by the CPU, the method further comprises:
- displaying a heat map query interface, the heat map query interface being used for querying for a blocking heat map of a virtual object participating in a target battle in the virtual environment, and the heat map query interface comprising at least one candidate virtual object; and
- receiving a selection operation performed on the target virtual object in the heat map query interface, the selection operation being used for querying for the blocking heat map of the target virtual object.

7. The method according to claim 1, wherein the displaying the heat map corresponding to the heat point position comprises:
- displaying the heat map corresponding to the heat point position in a map display region corresponding to the virtual environment.

8. A computer device, comprising a central processing unit (CPU), a graphics processing unit (GPU) that is communicatively connected to the CPU, and a memory, the memory storing at least one program, the at least one program, when executed by the CPU and the GPU, cause the computer device to perform a plurality of operations including:
- acquiring coordinate data of a heat point position by the CPU, and transmitting the coordinate data from the CPU to the GPU, wherein acquiring the coordinate data of the heat point position by the CPU comprises acquiring historical blocking coordinate data of a target virtual object in a virtual environment, the historical blocking coordinate data comprising blocking coordinates of the target virtual object in at least one virtual battle round;
- converting a point primitive set corresponding to the coordinate data into a patch primitive set by the GPU, the patch primitive set comprising patch primitives corresponding to the coordinate data, the patch primitives being combined to generate a heat point region corresponding to the coordinate data in a heat map, wherein the heat map is used for representing a blocking arrangement of the target virtual object in the virtual environment;
- shading and rendering the patch primitive set by the GPU, to obtain the heat map; and
- displaying the heat map corresponding to the heat point position.

9. The computer device according to claim 8, wherein the shading and rendering the patch primitive set by the GPU, to obtain a heat map comprises:
- obtaining a grayscale map corresponding to the patch primitive set by the GPU; and
- shading the grayscale map using a shader by the GPU, to obtain a color heat map corresponding to the heat point position.

10. The computer device according to claim 9, wherein the obtaining a grayscale map corresponding to the patch primitive set by the GPU comprises:
- performing translucence processing on patch primitives in the patch primitive set by the GPU, to obtain the grayscale map corresponding to the patch primitive set.

11. The computer device according to claim 9, wherein the shading the grayscale map using a shader by the GPU, to obtain a color heat map corresponding to the heat point position comprises:
- obtaining a reference color texture, the reference color texture comprising a color arrangement that is positively correlated with a heat point situation in the heat map; and
- shading the grayscale map by using a shader with reference to the reference color texture, to obtain the color heat map corresponding to the heat point position.

12. The computer device according to claim 8, wherein the acquiring historical blocking coordinate data of the target virtual object in the virtual environment by the CPU comprises:
- acquiring position information of the target virtual object in the virtual environment at each predefined duration by the CPU, to obtain the historical blocking coordinate data.

13. The computer device according to claim 8, wherein the plurality of operations further comprise:
- before acquiring historical blocking coordinate data of the target virtual object in the virtual environment by the CPU,
- displaying a heat map query interface, the heat map query interface being used for querying for a blocking heat map of a virtual object participating in a target battle in the virtual environment, and the heat map query interface comprising at least one candidate virtual object; and
- receiving a selection operation performed on the target virtual object in the heat map query interface, the selection operation being used for querying for the blocking heat map of the target virtual object.

14. The computer device according to claim 8, wherein the displaying the heat map corresponding to the heat point position comprises:

displaying the heat map corresponding to the heat point position in a map display region corresponding to the virtual environment.

15. A non-transitory computer-readable storage medium, storing at least one computer program, the computer program, when executed by a central processing unit (CPU) and a graphics processing unit (GPU) communicatively connected to the CPU within a computer device, causes the computer device to perform a plurality of operations including:
- acquiring coordinate data of a heat point position by the CPU, and transmitting the coordinate data from the CPU to the GPU, wherein acquiring the coordinate data of the heat point position by the CPU comprises acquiring historical blocking coordinate data of a target virtual object in a virtual environment, the historical blocking coordinate data comprising blocking coordinates of the target virtual object in at least one virtual battle round;
- converting a point primitive set corresponding to the coordinate data into a patch primitive set by the GPU, the patch primitive set comprising patch primitives corresponding to the coordinate data, the patch primitives being combined to generate a heat point region corresponding to the coordinate data in a heat map, wherein the heat map is used for representing a blocking arrangement of the target virtual object in the virtual environment;
- shading and rendering the patch primitive set by the GPU, to obtain the heat map; and
- displaying the heat map corresponding to the heat point position.

16. The non-transitory computer-readable storage medium according to claim 15, wherein the shading and rendering the patch primitive set by the GPU, to obtain a heat map comprises:
- obtaining a grayscale map corresponding to the patch primitive set by the GPU; and
- shading the grayscale map using a shader by the GPU, to obtain a color heat map corresponding to the heat point position.

17. The non-transitory computer-readable storage medium according to claim 16, wherein the obtaining a grayscale map corresponding to the patch primitive set by the GPU comprises:
- performing translucence processing on patch primitives in the patch primitive set by the GPU, to obtain the grayscale map corresponding to the patch primitive set.

* * * * *